April 15, 1941.  J. F. WEIN  2,238,143
PHOTOELECTRIC SOUND REPRODUCER
Filed Sept. 30, 1939
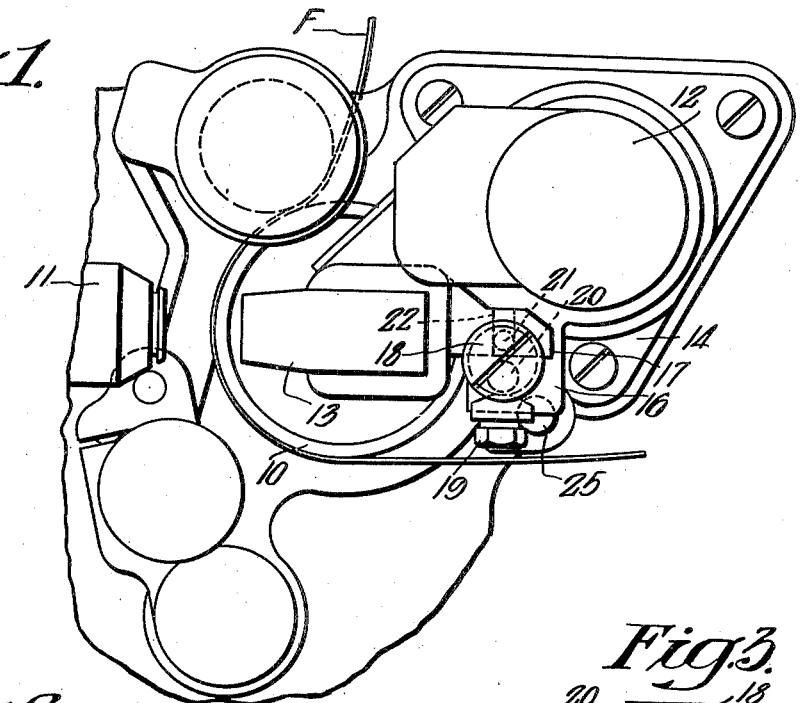
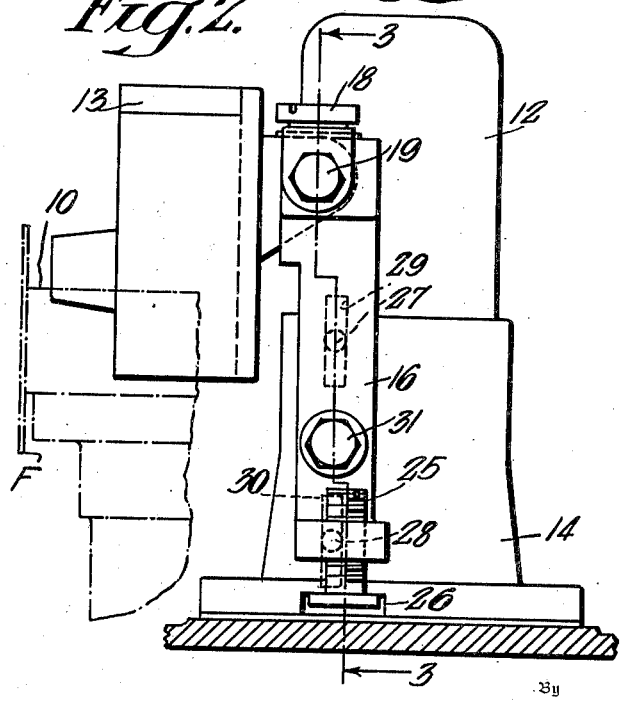
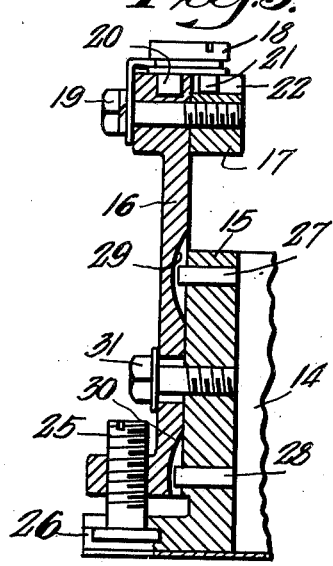
Inventor
John F. Wein
By
Attorney Patented Apr. 15, 1941

2,238,143

UNITED STATES PATENT OFFICE 2,238,143

PHOTOELECTRIC SOUND REPRODUCER

John F. Wein, Indianapolis, Ind., assignor to Radio Corporation of America, a corporation of Delaware Application September 30, 1939, Serial No. 297,261

2 Claims. (Cl. 179—100.3)

This invention relates to a photoelectric sound reproducer and more particularly to a mount for the optical system directing sound modulated light from the translation point to the photoelectric cell in a push-pull sound reproducer.

There have heretofore been constructed many types of push-pull sound reproduction apparatus, some adapted for separate sound tracks and others adapted for adjacent portions of the same sound track. At the present time, the type of push-pull reproducer which is found commercially acceptable is adapted for use with two oppositely phased halves of the sound record on the standard sound track area, the two halves being arranged side by side and with a very narrow space of the order of a few thousandths of an inch between them.

In the reproduction of such a sound record a fine line of light having a width of the order of $5/10,000$ths of an inch is directed upon the sound track and the light passing through the sound track is divided in accordance with the portions thereof through which it passes, the portion from one half of the sound track being directed to one cathode of a push-pull photocell and the portion from the other half of the track being directed to the other cathode hereof. An appropriate optical system for accomplishing this result is shown, for example, in Dimmick Patent 2,164,735.

The mounting of such an optical system is somewhat difficult as the entrance pupil thereof must be accurately aligned with the optical system directing light upon the film and the optical system must be so located laterally of the film that the division of light between the two photocell cathodes accurately corresponds with the division between the two halves of the sound track.

The apparatus of the present invention provides a mounting for rigidly securing an optical system of the type described in proper relation to both the film and the photocell and at the same time is provided with such adjustments that the optical system may be adjusted into exact position and then securely bolted in adjustment.

One object of the invention is to provide an improved push-pull optical system.

Another object of the invention is to provide an improved adjusting mechanism for an optical system mount.

Another object of the invention is to provide an improved means for securing an optical system in predetermined relation to both a sound record film and a photocell.

Other and incidental objects of the invention will be apparent to those skilled in the art from a reading of the following specification and an inspection of the accompanying drawing in which Figure 1 is a side view of my improved method showing the film drum photocell mount and optical system as mounted in a soundhead;

Figure 2 is a view taken from the right-hand side of Fig. 1; and

Figure 3 is a section through the mounting bracket on the line 3—3 of Fig. 2.

Referring first to Figure 1, which shows a portion of the side view of a soundhead of the general type shown in Loomis et al. Patent 2,019,147, the film F passes downwardly from the picture-head and around the film drum 10 which supports it with the sound track overhanging the edge of the drum in alignment with the optical system 11 which focuses a narrow transverse line of light upon the film at the translation point. Since the other mechanical features of the soundhead are described in the aforesaid patent, a detailed description of them is unnecessary. Light passing through the film F at the translation point is received by the optical system generally indicated at 13 which directs it in the form of a separated beam onto the two cathodes of a push-pull photocell located within the photocell shield 12. The photocell and the details of construction of the optical system are not shown here inasmuch as they are shown in the aforesaid Dimmick patent.

The optical system bracket is mounted on a member which is made integral with the photocell base 14. This integral member consists of a portion 15 which is provided with a flat face against which the bracket member 16 fits. This bracket member 16 in turn carries a member 17 which is made integral with the optical system casing. The member 17 is movable toward and away from the film F for the purpose of focusing and this movement is accomplished by means of the cam screw 18. This cam 18 has one portion 20 which fits rotatably into the bracket 16 and another cylindrical extension 21 which fits into a slot 22 in the member 17. The member 17 is also held to the member 16 by the cap screw 19 which is slidable in the member 16 in the direction of movement of the member 17. In order to focus the optical system the slotted head 18 is rotated in the proper direction and the member 17 together with the optical system 13 is bodily moved toward or away from the film. When the system is in proper focal adjustment the cap screw 19 is tightened thereby firmly securing the member 17 to the member 16.

Lateral adjustment of the optical system in relation to the sound track is accomplished by means of the screw 25. It will be noticed that the screw 25 is provided with an enlarged head opposite its slotted end which fits into the slot 26 in the member 15. Rotation of the screw in one direction will force the member 16 outwardly in relation to the photocell base 14 while rotation of the screw in the opposite direction will pull it inwardly by reason of the engagement of the head of the screw in the slot 26. The member 16 is precluded from lateral movement which would tend to throw the optical system out of adjustment by means of the pins 27 and 28 which are pressed into the member 15 and the ends of which fit into the keyways 29 and 30 in the bracket 16. A cap screw 31 is provided which is threaded into the member 15 and which fits into an enlarged hole in the member 16 permitting movement of the member 16 for lateral adjustment. After the adjustment is completed by means of the screw 25 the cap screw 31 is tightened thereby securing the member 16 rigidly to the member 15.

Having now described my invention, I claim:

1. In a sound reproducing apparatus including means for moving a film past a translation point, means for directing light through the film, and a photocell adapted to receive light passing through the film, an optical system for directing light from the film to the photocell, said optical system being mounted on a bracket, said bracket being adjustable for movement of the optical system laterally of the film, the adjusting means for said bracket including pins in a fixed member cooperating with keyways in said bracket for maintaining the bracket in alignment, a screw for moving said bracket along said keyways, and a screw for clamping said bracket to said fixed member.

2. In a sound reproducing apparatus including means for moving a film past a translation point, means for directing light through the film, and a photocell adapted to receive light passing through the film, an optical system for directing light from the film to the photocell, a bracket supporting said optical system, means for adjusting said optical system toward and away from said film on said bracket, said adjusting means including a cam and a screw locking means, said bracket being adjustable for movement of the optical system laterally of the film, the adjusting means for said bracket including pins in a fixed member cooperating with keyways in said bracket for maintaining the bracket in alignment, a screw for moving said bracket along said keyways, and a screw for clamping said bracket to said fixed member.

JOHN F. WEIN.